United States Patent [19]

Teegarden

[11] Patent Number: 4,997,894
[45] Date of Patent: Mar. 5, 1991

[54] BLOCK COPOLYMERS CONTAINING VINYL AND ARYLENE SULFIDE SEGMENTS VIA CHAIN TRANSFER

[75] Inventor: David M. Teegarden, Rochester, N.Y.

[73] Assignee: Eastman Kodak Company, Rochester, N.Y.

[21] Appl. No.: 476,910

[22] Filed: Feb. 8, 1990

[51] Int. Cl.$^5$ ............................................. C08L 81/02
[52] U.S. Cl. ..................................... 525/537; 525/189
[58] Field of Search .................................. 525/189, 537

[56] References Cited

U.S. PATENT DOCUMENTS

| | | |
|---|---|---|
| 4,146,697 | 3/1979 | White. |
| 4,226,951 | 10/1980 | White. |
| 4,699,950 | 10/1987 | Sato et al. ............................ 525/189 |
| 4,786,713 | 11/1988 | Rule et al.. |
| 4,792,600 | 12/1988 | Rule et al.. |
| 4,826,956 | 5/1989 | Fagerburg et al.. |
| 4,855,393 | 8/1989 | Fagerburg et al.. |

FOREIGN PATENT DOCUMENTS

| | | | |
|---|---|---|---|
| 315478 | 5/1989 | European Pat. Off. ............. | 525/537 |
| 315480 | 5/1989 | European Pat. Off. ............. | 525/537 |

OTHER PUBLICATIONS

Hallensleben, Manfred L., European Polymer Journal, 13, 437–440 (1977).
Hallensleben, Manfred L., Polymer Bulletin, 1, 557–562 (1979).

*Primary Examiner*—L. T. Jacobs
*Assistant Examiner*—David W. Woodward
*Attorney, Agent, or Firm*—Robert A. Linn

[57] ABSTRACT

Block copolymers of vinyl monomers and thioarylene segments are prepared from copoly(arylene sulfide-disulfides), i.e., copoly(arylene sulfides) having an appreciable quantity of disulfide linkages in the polymer chains. Such copoly(arylene sulfides) correspond to the structure $[(-A-S-)_{1-x}(A-S-S-)_x]_n$, wherein X is in the range of 0.5 to 0.001 based on the combined number of (—A—S—) and (A—S—S—) units. In a preferred embodiment n is at least 200; however, polymers and prepolymers having a much lower degree of polymerization can be used, e.g., materials where n is about 25 or higher. To prepare the block copolymers, an unsaturated monomer capable of undergoing free radical addition polymerization under the reaction conditions employed is subjected to such polymerization in the presence of the copoly(arylene sulfide-disulfide) having the above formula. During the course of the polymerization, chain transfer occurs resulting in formation of the block copolymers.

13 Claims, 1 Drawing Sheet

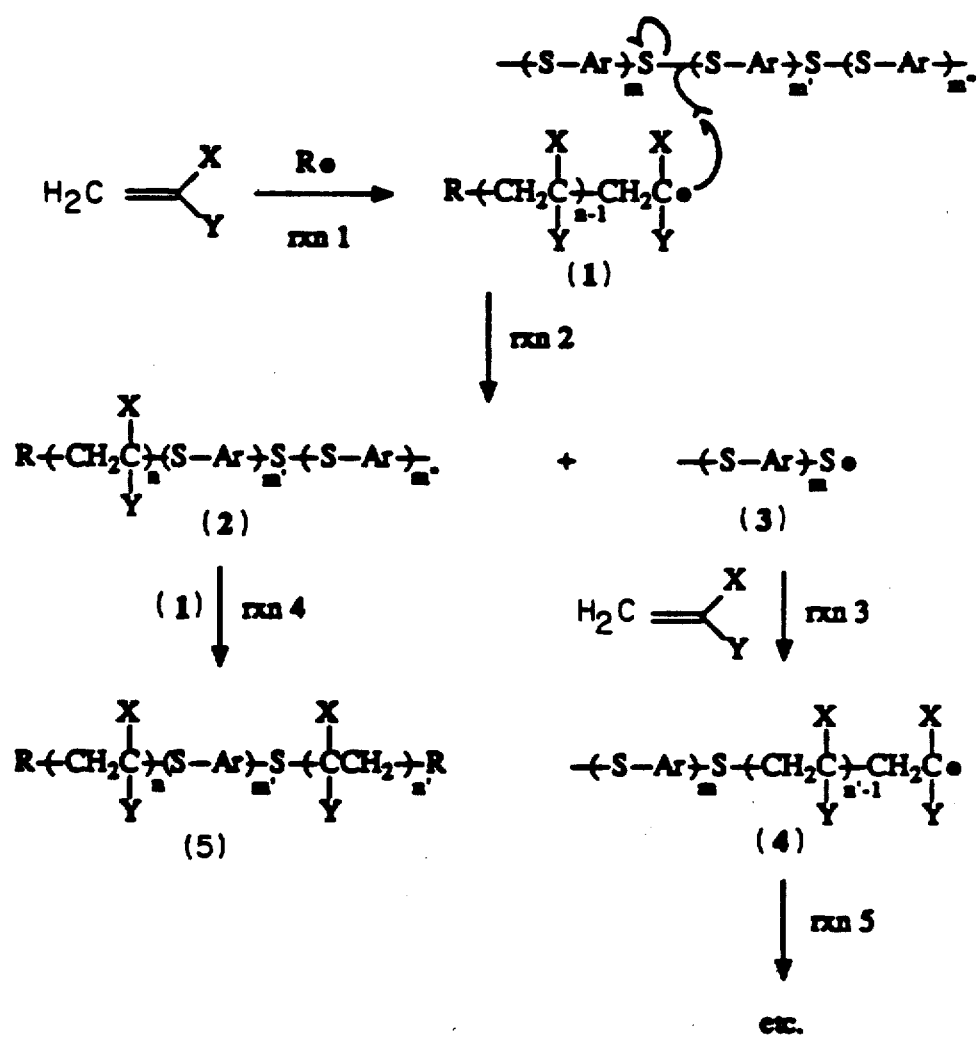

BLOCK COPOLYMERS CONTAINING VINYL AND ARYLENE SULFIDE SEGMENTS VIA CHAIN TRANSFER

FIELD OF THE INVENTION

This invention relates to block copolymers having vinyl monomer and thioarylene segments. It also relates to a process for preparing the copolymers.

BACKGROUND OF THE INVENTION

Poly(arylene sulfide) (PAS) resins are thermoplastic polymeric materials with good thermal stability, unusual insolubility, resistance to chemical environments, and inherent flame resistance. PAS resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps, and other equipment.

Poly(phenylene sulfide) (PPS) is a commercial product which is generally produced by reacting p-dichlorobenzene with sodium sulfide in a polar organic solvent to produce PPS and the by-product sodium chloride. This process is known as the Macallum polymerization procedure, and the basic process is disclosed in U.S. Pat. No. 2,513,188 and U.S. Pat. No. 2,583,941. An improvement on the Macallum polymerization procedure involves adding N-haloamides as catalysts in the procedure (U.S. Pat. No. 3,285,882). The Macallum polymerization utilizes only chloroaromatic compounds.

The PPS which is formed in the Macallum process has only a modest molecular weight on the order of 10,000–40,000 and has relatively low melt viscosity. Higher molecular weights can be obtained by heating the PPS in the presence of oxygen. During heating, the molecular weight of the PPS increases due to a variety of chemical reactions including oxidation, cross-linking, and chain extension. These curing reactions result in polymers which have inherent brittleness and reduced drawing capability while only achieving modest increases in molecular weight. Additionally, PPS which is produced by polymerization In the presence of sulfide and/or hydrosulfide salts, such as sodium sulfide and sodium hydrosulfide, has a residual content of inorganic salt present in the polymer. These residual salts are, for example, sodium chloride and sodium sulfide resulting from the combination of the sodium cation with chlorine or sulfide from the starting materials. The presence of these residual salts in the polymer increases the corrosive nature of the polymer and can cause a deterioration in the drawing or spinning characteristics of the polymer. Residual salts can also result in breakages in the spun fibers and additionally contribute to plugging and clogging of the spinnert holes.

An additional problem with poly(arylene sulfide) produced by the Macallum process is the effect of residual salts on the electrical properties. The presence of residual salts results in polymers with increased moisture adsorption and electrical activity, which are detrimental to applications requiring highly insulating characteristics. Although extensive extraction reduces the salt content of PPS produced by the Macallum process, complete removal of these salts is commercially infeasible.

An additional problem with PPS produced by the Macallum process is the high rate of crystallization of these polymers. Although some applications do require high rates of crystallization, many applications require much slower rates of crystallization. These polymers contain no substantial quantities of disulfide units.

Recently, poly(arylene sulfides) which do not contain substantial quantities of alkali metals have been discovered. These copolymers do not contain substantial quantities of alkali metals, simply because no alkali metal is used in the process to prepare them. They also have a variable rate of recrystallization, and contain small but substantial amounts of (—A—S—S—) units in the polymer chain.

The vast majority of units in these newly discovered polymers is (—A—S—) units, and the number of (—A—S—S—) or disulfide units is small compared to the number of (—A—S—) units. However, the number of (—A—S—S—) units in the copolymers is substantial, i.e. adequate for the instant invention.

Patents which relate to these newly discovered copolymers are U.S. Pat. Nos. 4,786,713; 4,792,600; 4,826,956; and 4,855,393, all assigned to Eastman Kodak Company. Copoly(arylene sulfide-disulfides) described in these patents are used as starting materials in the process of this invention.

In the process of this invention, advantage is taken of the disulfide linkages in the polymers described in the above-identified, recently issued patents. More specifically, such disulfide linkages are used as reactive sites to which chain transfer occurs, resulting in a new class of block copolymers.

Chain transfer mechanisms from growing polymer chains to disulfide linkages in dissimilar disulfide polymers have been described in the literature; Hallensleben, *European Polymer Journal*, Vol. 13, pp. 437–440 (1977), and *Polymer Bulletin* 1, 557–562 (1979). The prior art reaction has been conducted at low temperature (60° C.) using polymers which are soluble and reactable at such temperatures. Such a process is not applicable to polyarylene sulfides made by the Macallum polymerization procedure, since those products do not have disulfide linkages. Applicant is the first to discover that radical chain transfer can take place using copoly(arylene sulfide disulfides) such as described in the recently issued patents cited above.

SUMMARY OF THIS INVENTION

This invention comprises new copolymers, and a process for making them. In the process an unsaturated monomer having a —C=C— bond is subjected to a free radical addition polymerization using a free radical initiator or other means for initiating reaction. The process is conducted in the presence of a poly(arylene sulfide) which is substantially free of aliphatic carbon-to-sulfur bonds, and which contains disulfide linkages.

More specifically, this invention provides a process for making block copolymers of vinyl monomers and thioarylene segments. Such copolymers are produced from poly(arylene sulfides) that contain disulfide bonds in the polymer chain. Such copolymers are referred to herein as copoly(arylene sulfide-disulfides). To prepare the block copolymers, an unsaturated monomer, such as an acrylate, is subjected to free radical polymerization in the presence of the copoly(arylene sulfide-disulfide). During the course of the reaction, chain transfer to disulfide occurs, resulting in the formation of block copolymer. Block copolymers can also form when an arylthiyl radical initiates the polymerization of monomer. Such a radical is produced as a by-product in a reaction of this invention. Segmented block copolymers are formed when any additional disulfide bonds in the block copolymers react as described above.

The process of this invention provides a means to improve the properties of poly(arylene sulfides) by chemically bonding one or more modifying polymeric units onto a poly(arylene sulfide). Stated another way, the process of this invention provides a means to bond polymeric units onto a poly(arylene sulfide) moiety in order to improve the properties of the poly(arylene sulfide). This method of property improvement is not available with polyarylene sulfides produced by the Macallum process, since those prior art materials do not contain disulfide linkages. Thus, the process of this invention provides a means to prepare poly(arylene sulfides) (PAS) which have, for example, decreased brittleness and higher impact strength. Moreover, the process of this invention provides a means for improving polyarylene sulfides which is not applicable to other common PAS materials, such as Ryton™, Supec™, Fortron™, Tedur™ resins, and the like.

As an example of the properties which can be obtained in specific instances, block copolymers of acrylates and 1,4-phenylene sulfide of this invention retain two glass transition temperatures by differential scanning calorimetry (DSC). For example, copolymers of ethyl acrylate and 1,4-phenylene sulfide prepared by this invention have Tg's (glass transition temperatures) at approximately −10° and 60° C. These Tg's are close to those of the resPective homopolymers (ca. −18° and 85° C.), strongly suggesting that the copolymers are microphase separated. These copolymers retain some additional properties of each of the comonomers. For example, samples with higher ethyl acrylate compositions are quite soluble in common organic solvents and form rubbery films, while those higher in phenylene sulfide are somewhat crystalline and are almost as insoluble as PPS itself.

The process of this invention is conducted at temperatures such as 125° C., or higher. There is no suggestion in the literature that the type of reaction conducted in this process would occur at such temperatures. Applicant has also discovered that the process of this invention can be conducted at such temperatures without substantial, untoward degradation of the reacting species. The process of this invention is conducted using a solvent for the poly(arylene sulfide-disulfide), such as biphenyl. Such a material is not commonly employed as a reaction solvent for free radical addition polymerizations.

One can tailor the properties of products prepared by his invention over extremely broad ranges, both by choice of the monomers incorporated and by adjustment of the copolymer composition. Mixtures of monomers and/or polyarylene sulfides can be used to tailor properties of the products. Difunctional monomers can be used to make cross linked products.

Copolymers such as these with the appropriate composition are useful as, for example, impact modifiers for high performance polymers (such as poly(arylene sulfides)).

DESCRIPTION OF THE DRAWING

The FIGURE in the drawing illustrates reactions which may take place during the process of this invention.

In reaction 1, a free radical initiator provides initiating fragment R such as an alkoxy radical or its decomposition product, which facilitates a free radical initiated, addition polymerization of unsaturated monomer,

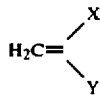

The polymerization yields a radical-containing polymeric unit (1). During the course of the polymerization, reaction of such a polymeric unit with a disulfide linkage in a copoly(arylene sulfide-disulfide) causes chain transfer to disulfide to occur (reaction 2). There are two products of reaction rxn 2. Product (2) is a block copolymer of this invention; it contains a block derived from the unsaturated monomer, and thioarylene units. The other produce of reaction 2 is an arylthiyl radical (3). That radical can react with additional unsaturated monomer to produce product (4), another copolymer of this invention. Product (2) can react with polymeric unit (1) to form (5) a segmented block copolymer of this invention. Product (4) can also react with additional unsaturated monomer, or with other disulfide bonds (reactions 2 and 3) to prepare other block copolymers of this invention. This is indicated at the bottom of the drawing by "etc".

For clarity, the FIGURE does not show chain termination reaction(s) used to terminate chain growth and produce additional block copolymers of this invention. Nor does it show hydrogen abstraction or other possible secondary reactions analogous to those which take place in radical transformations known to those skilled in the art.

Thus, a product of a process of this invention comprises a mixture of block copolymers produced by reactions such as illustrated by the FIGURE. The mixture of products may be isolated and used as such; e.g., to prepare impact modifiers for high performance polymers (such as poly(arylene sulfides) or poly(arylene sulfide-disulfides).

Although the relative portion of each type of reaction illustrated in the FIGURE can be of importance in conferring properties and/or characteristics on the products of this invention, Applicant's invention is not to be bounded by the extent to which any one of the reaction takes place.

DESCRIPTION OF PREFERRED EMBODIMENTS

In one embodiment, this invention provides process for the preparation of a block copolymer having a block of vinyl monomers and a block of thioarylene segments, said process comprising subjecting an unsaturated monomer to free radical polymerization in the presence of a polyarylene sulfide containing disulfide linkages;

said free radical polymerization being initiated by a free radical initiator, and being conducted in the presence of a solvent for said polyarylene sulfide and said vinyl monomer, and being conducted at a temperature within the range of from about 125° C. to about 250° C.;

whereby during the course of said polymerization chain transfer from said block of vinyl monomers to disulfide in said polyarylene sulfide occurs, thereby forming said block copolymer.

In another embodiment, this invention comprises the product of the above described process.

In a highly preferred embodiment, this invention comprises the product produced by reaction (2) in the FIGURE.

As a starting material for use in the process of this invention, one uses a poly)arylene sulfide) which has a substantial portion of disulfide linkages. Such products are selected from products of the type described in above-cited U.S. Pat. Nos. 4,786,713; 4,792,600; 4,826,956; and 4,855,393.

In these starting materials, the vast majority of units in the copolymer are the (—A—S—) unit and the number of (—A—S—S—) or disulfide units are small compared to the number of (—A—S—) units. Generally, the fraction of (—A—S—S—) units is in the range of 0.5 to 0.001, based on the combined number of both (—A—S—) and (—A—S—S—) units. Thus, the copolymer can be represented as

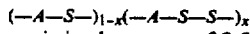

where x is in the range of 0.5 to 0.001. The sequence of (—A—S—) and (—A—S—S—) units is thought to be random throughout the molecular chain. When x is in the range of 0.5 to 0.2, the polymers obtained when A is p-phenylene are amorphous and can be crystallized only with difficulty. When x is in the range of 0.2 to 0.1, the polymers obtained can be thermally crystallized and have crystalline melting points of 230° C.-260° C. When x is in the range of 0.1 to 0.05, the polymers obtained have moderate crystallization rates and the crystallized polymers can be annealed to high crystalline melting points (280° C.-290° C.) and show Tch (temperature of crystallization on heating) and Tcc (temperature of crystallization on cooling) at increasingly lower and higher temperatures, respectively, indicative of increasing rates of crystallization. When x is in the range of 0.05 to 0.001, the crystallization rate increases rapidly with decreasing x.

The size of the polymer chain can conveniently be expressed as the total number of each kind of unit in the chain. Therefore, the copoly(arylene sulfide) can be more specifically expressed as corresponding to the structure

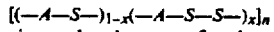

wherein n, the degree of polymerization, is at least 100, more preferably at least 200 and most preferably in the range of 500 to 5,000 as determined by melt viscosity measurement at 300° C. The degree of polymerization when A is p-phenylene can be calculated using the relationship log (n)=1.473+0.2873 ×log (melt viscosity) where melt viscosity is measured in poise. It is to be understood that the process of this invention can be conducted using a material of the above formula where n is smaller than discussed above. Thus, polymers and prepolymers wherein n is about 25 or higher can be used.

In the above formula A is a divalent arylene radical. It is derived from the diiodoaromatic(s), used in the process to form the copoly(arylene sulfide disulfide).

Diiodoaromatic compounds which can be utilized include unsubstituted or substituted aromatics which have two iodine substituents. Suitable diiodoaromatic compounds include hydrocarbon aromatics, nitrogen-containing aromatics, sulfur containing aromatics, and oxygen-containing aromatics. Typical hydrocarbon aromatics include benzene and diphenyl, and condensed ring aromatics such as naphthalene and anthracene.

Typical sulfur-containing aromatics include, for example, thiophene and benzothiophene. Typical nitrogen-containing aromatics include pyridine and quinoline. Suitable oxygen containing aromatics are, for example, furan, dibenzofuran, etc. Substituted diiodoaromatic compounds suitable for use with the present invention include aromatic sulfones, diarylethers, diarylcarbonyls, diarylsulfides, and the like.

The aromatic starting materials may be substituted by one or more alkyl groups, preferably alkyl groups having from 1-6 carbon atoms. Specially preferred alkyl groups are methyl, ethyl, propyl, and butyl groups. There is no limitation on the spatial arrangement of the substituents; for example, the substituents may be on a carbon adjacent to an iodine bearing carbon or may be on a carbon atom further removed from the iodine bearing carbon.

Additional substituents on the aromatic compounds may include phenyl, halogen, nitro, $C_{1-6}$ alkoxy, and carboxylate and carboxylic acid substituents, as well as aryl sulfones and aryl ketones.

Preferred diiodoaromatic compounds are the diiodobenzenes, diiodonaphthalenes, diiodobiphenyls, diiododiphenyl ethers, and diiodotoluenes which may be unsubstituted or substituted with any of the substituents noted above.

Specific diiodoaromatic compounds suitable for the present ;invention include p-diiodobenzene, m-diiodobenzene, p,p'-diiodobiphenyl, m,p'-diiodobiphenyl, p,p'-diiododiphenyl sulfone, p,p'-diiododiphenyl ether, 2,6-diiodonaphthalene, and p,p'-diiodobenzophenone. p-Diiodobenzene, p,p'-diiodobiphenyl, and p,p'-diiododiphenyl ether are most preferred.

Thus, the divalent arylene group in the above formula can be an isolated ring or in a fused aromatic ring system. Preferably A has from 6 to about 18 carbon atoms and is solely composed of carbon and hydrogen.

The other starting material used in the process of this invention is an unsaturated monomer. Suitable monomers include any olefinically unsaturated organic compound which is capable of undergoing free radical addition polymerization under the reaction conditions employed. Such monomers can be represented by the formula

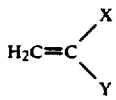

wherein X and Y are alike or different and which are selected from hydrogen and organic radicals that (a) are substantially stable under the reaction conditions employed, i.e., they do not undergo an unacceptable amount of decomposition during the process of this invention, (b) are suitable for the reaction; that is, that during the course of the process of this invention, they do not undergo an unacceptable amount of extraneous side reactions, and (c) are inert, i.e., they do not interfere with the process of this invention via steric hindrance or other mechanism, and do not interfere with the radical formation which occurs during the process.

The unsaturated monomers may be selected from styrenics, i.e., styrene, or alpha alkyl styrenes where the alkyl group has 1 to 10 carbon atoms; preferably the alkyl group is a lower primary alkyl group of 1 to 4 carbon atoms. The aromatic group in the styrenic monomer may be substituted, or in a ring system such as illustrated by the substituents and the ring systems set forth when discussing the arylene group "A", above.

Another class of applicable unsaturated monomers are acrylate esters derived from alcohols or phenols having an aryl group, preferably derived from alcohols having a primary or secondary alkyl group of 1 to about 4 carbon atoms. Methyl acrylate, ethyl acrylate, isopropyl acrylate, and sec butyl acrylate are examples.

Still another class of applicable monomers are vinyl esters derived from straight chain and branched acids having primary and secondary carbon atoms, and up to about 4 carbon atoms. Vinyl acetate, vinyl propionate, vinyl isopropionate, and vinyl n-butyrate are examples.

In the process of this invention, the molar ratio of monomer to disulfide linkages in the copoly(arylene sulfide-disulfide) is from about 1000 to 1 to about 2 to 1, more preferably from about 100 to 1 to about 5 to 1. Thus, the process is conducted using a molar excess of monomer to facilitate formation of block(s) from the monomer. It is possible to conduct the process using a molar ratio of reactants outside the range given above. For example, the process can be conducted using a mole ratio of monomer to disulfide linkages greater than 1000 to 1. It is preferred to use enough disulfide linkages so that statistically speaking, their availability will be sufficient to allow a desired product to be prepared.

The above described reactants are caused to react in solution using a free radical initiator. Typically, the amount of initiator is from 0.01 to 10 weight percent of the monomer, more preferably about 0.1 weight percent. Suitable initiators include peroxides, hydroperoxides, azo compounds, redox initiators, photoinitiators, and other types of initiators and/or promoters familiar to those in the art. At a sufficiently high polymerization temperature (approximately 200° C. or higher), or if irradiated with light of suitable wavelength, disulfide groups undergo homolytic scission and initiate polymerization, precluding the necessity of added initiator. A list of applicable free radical initiators is set forth in column 2, line 41, to column 3, line 15, of U.S. Pat. No. 4,146,697. That description is incorporated by reference herein as is fully set forth.

If thermal initiation or initiation with light is used, that number of disulfide linkages available for chain transfer reaction will be reduced. In such a case, block copolymer formation via initiation with an arylthiyl radical at a monomer double bond (reaction 3 in the FIGURE) would assume additional importance in the formation of product of this invention.

As stated above, the process of this invention is conducted in a solvent. Preferably the concentration of the copoly(arylene sulfide-disulfide) is not 1-50%; more preferably 5-25%, by weight.

The chain transfer constant for (—A—S—S—) in the solvent must be high enough to allow chain transfer to occur to the desired extent. The chain transfer constant for transfer to solvent must be low enough to prevent untoward termination in the polymerization of the unsaturated monomer.

The solvent should be inert under the reaction conditions employed, and have suitable solvent power to provide solute concentrations in a range given above. The compound biphenyl is a good solvent for the process. Other solvents suggested are N-methylpyrrolidone, N-methylcaprolactam, N-cyclohexylpyrrolidone, and the like.

The process is suitably conducted at ambient pressure. Superatmospheric pressures, e.g., 5-50 atmospheres can be used when it is desired to conduct the reaction at a temperature above the normal boiling point of a monomer or a solvent.

Preferably the process is conducted at a temperature which gives a suitable reaction rate and a suitable reaction time. Reaction temperatures are preferably from about 100° C. to about 250° C.; more preferably from about 125° C. to about 200° C. Temperatures somewhat outside the ranges can be used, if desired. In general, reaction time is inversely related to reaction temperature. Temperatures below that required for a reasonable rate of reaction are not preferred; similarly temperatures which are sufficient to decompose the reactants are also not preferred. However, momentary excursions into a non preferred temperature range can be tolerated in many instances.

The reaction time is not a truly independent variable. It is dependent at least to some extent upon other reaction conditions, such as the temperatures, and the inherent reactivity of the reactants. Reaction times of 4 to about 48 hours are usually sufficient.

Although important, the reaction temperature, time, and pressure, and the nature of the solvent and concentration of reactants are not critical features of the process of this invention.

The reactants can be introduced into the reaction zone as desired. In a batch process it is convenient to add the copoly(arylene sulfide disulfide) to a reaction vessel containing the solvent, and then maintain the temperature of the resultant mixture at or near the reaction temperature until the polymer starting material is in solution. Thereafter the monomer and free radical initiator are added and the reaction mixture stirred or otherwise agitated during the reaction period.

As appreciated by a skilled practitioner, the reaction system employed by Applicant is somewhat complex. For example, if the reaction temperature is high enough, the unsaturated monomer may undergo some thermal polymerization. (If desired, the product of such polymerization can be removed from the other materials. As shown in the following example, such a product has been removed by dissolving it in a solvent.) Secondly, at elevated temperatures a polysulfide may undergo homolytic cleavage to form radicals which can initiate free radical addition polymerization. Thirdly, under some conditions the process of this invention may also involve hydrogen abstraction from a polymer chain, leading possibly to branching. This event might also result in termination of a growing polymer chain. In addition to termination by abstraction, termination may also occur by combination of two growing polymer chains (termination by combination), or by disproportionation.

The products of this invention are solids or semi-solids with limited solubility. Hence it is difficult or nearly impossible to determine their molecular weight.

EXAMPLE 1

A 50 mL reaction bottle was charged with 3.0 g of finely divided PPS (poly 1,4-phenylene sulfide) containing 18 mol % disulfide bonds, and 18.0 g of reagent grade biphenyl. The bottle was connected to a vacuum line, subjected to 3 freeze-thaw cycles (only the biphenyl was melted), and then sealed with a rubber septum. The bottle was heated in an oil bath at 175° C. until a homogeneous solution formed. Then a solution of 6.0 mL (5.5 g) of deinhibited ethyl acrylate and 0.06 g of t-butyl peroxide was added by syringe, and the solution heated at 175° C. for 24 hours.

The reaction mixture was crushed and then extracted with hot ethanol to remove biphenyl, any ethyl acrylate monomer, and poly(ethyl acrylate) homopolymer. Then the residue was extracted with hot toluene and the toluene evaporated to afford 1.0 g of a 35% phenylene sulfide segments. The insoluble residue of the toluene extraction analyzed for 80% PPS, 20% ethyl acrylate segments.

EXAMPLE 2

A 50 mL reaction bottle was charged with 2.5 g of finely divided PPS containing 27 mol % disulfide bonds, and 20.0 g of reagent grade biphenyl. The bottle was connected to a vacuum line, subjected to 3, freeze-thaw cycles (only the biphenyl was melted), and then sealed with a rubber septum. The bottle was heated in an oil bath at 175° C. until a homogeneous solution formed. Then a solution of 5.0 mL (4.4 g) of deinhibited (+/−)-2-ethylhexyl acrylate and 0.05 g of t-butyl peroxide was added by syringe, and the solution heated at 150° C. for 24 hours.

The reaction mixture was extracted with hot THF to remove biphenyl, any 2-ethylhexyl acrylate monomer, and poly(2-ethylhexyl acrylate) homopolymer. Then the residue was extracted with hot toluene and the toluene evaporated to afford 1.4 g of a tan solid which analyzed for approximately 55% 2-ethylhexyl acrylate and 45% phenylene sulfide segments. The insoluble residue of the toluene extraction analyzed for approximately 80% PPS, 15% 2-ethylhexyl acrylate segments.

The above procedure can be repeated using a reaction temperature of 125° C.-250° C., a reaction time of 4-48 hours, and a concentration of tert-butyl peroxide of from 0.05 to 0.5 weight percent of acrylate monomer. The concentration of monomer can be from 1000 to 1 to 5 to 1 based on the number of disulfide linkages. Preferably, the number of disulfide (—S—S—) linkages per sulfide linkages (—S—) is from 0.001 to 0.5; preferably 0.01 to 0.04, more preferably 0.03 to 0.3.

The acrylate used in the above example can be replaced with ethylene and the reaction conducted at a pressure of from 10 to 50 atmospheres. Alternatively, the process can be conducted using n-propyl acrylate, sec-butyl acrylate, vinyl acetate, vinyl propionate, and styrene, for example, and the process conducted at a lower pressure, e.g., atmospheric pressure.

The invention has been described above with particular reference to preferred embodiments. A skilled practitioner familiar with the above detailed without departing from the scope and spirit of the claims that follow.

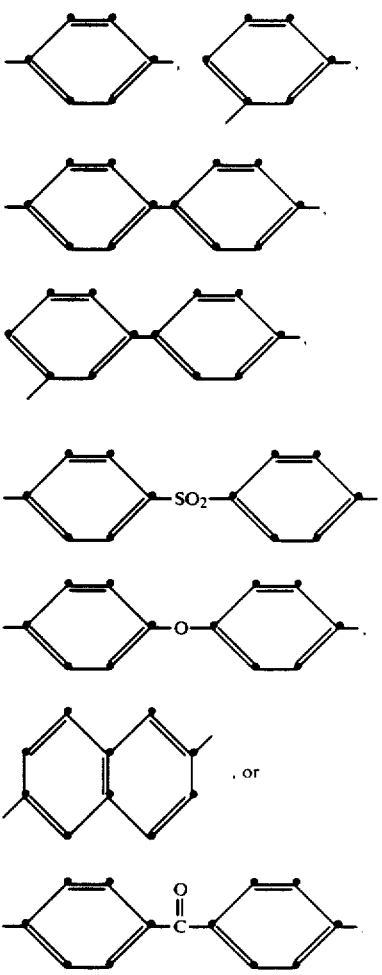

I claim:

1. Process for the preparation of a block copolymer having a block of vinyl monomers and a block of thioarylene segments, said process comprising subjecting an unsaturated monomer to free radical polymerization in the presence of a polyarylene sulfide containing disulfide linkages, said polyarylene sulfide has the formula: ((—A—S—)$_{1-x}$(A—S—S)$_x$), wherein x is in the range of 0.5 to 0.001, n is at least 25 and A is a divalent arylene group having a fused or isolated aromatic ring and from 6 to 18 carbon atoms, and is solely composed of carbon and hydrogen.

said free radical polymerization being initiated by a free radical initiator, and being conducted in the presence of a solvent for said polyarylene sulfide and said vinyl monomer, and being conducted at a temperature within the range of from about 125° C. to about 250° C.;

whereby during the course of said polymerization chain transfer from said block of vinyl monomers to disulfide in said polyarylene sulfide occurs, thereby forming said block copolymer.

2. Process of claim 1 wherein said solvent is a solid at room temperature.

3. Process of claim 2, wherein said solvent is biphenyl.

4. Process of claim 1 wherein the arylene group in said thioarylene segments is

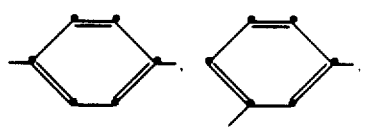

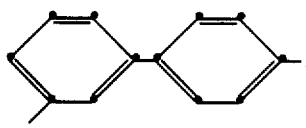

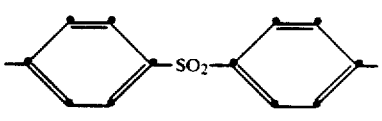

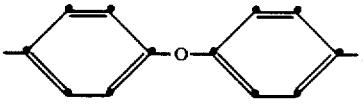

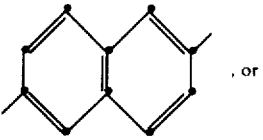

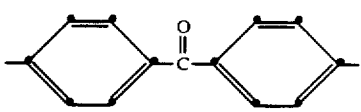

5. Process of claim 4 wherein said arylene group in said thioarylene segments is

6. Process of claim 1 wherein said unsaturated monomer is styrene, or an alpha alkyl styrene wherein the alkyl group is 1 to 10 carbon atoms, or an acrylate ester wherein the alcohol portion of the ester is a primary or secondary alkyl group of 1 to about 4 carbon atoms, or a vinyl ester wherein the acid group in said ester has up to about four carbon atoms.

7. Process of claim 6, wherein said unsaturated monomer is ethyl acrylate, and said polyarylene sulfide is poly(1,4-phenylene sulfide) containing 18 mole·% disulfide bonds.

8. Process of claim 1 wherein said unsaturated monomer is 2-ethylhexyl acrylate, and said polyarylene sulfide is poly(1,4-phenylene sulfide) containing 27 mole percent disulfide bonds.

9. Process of claim 3 conducted at a temperature of 125° C.-250° C.

10. Process for the preparation of a block copolymer having a block of vinyl monomers and a block of thioarylene segments, said process comprising subjecting an unsaturated monomer to free radical polymerization in the presence of a polyarylene sulfide containing disulfide linkages;

said free radical polymerization being initiated by a free radical initiator, and being conducted in the presence of biphenyl as a solvent for said polyarylene sulfide and said vinyl monomer, and being conducted at a temperature within the range of from about 125° C. to about 250° C.;

whereby during the course of said polymerization chain transfer from said block of vinyl monomer to disulfide in said polyarylene sulfide occurs, thereby forming said block copolymer.

11. Process of claim 10 wherein said polyarylene sulfide is poly(1,4-phenylene sulfide) wherein the fraction of (—A—S—S—) units, wherein A is 1,4-phenylene, is from 0.001 to 0.5.

12. Process of claim 11 wherein said polyarylene sulfide has the formula:

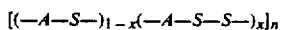

wherein x is in the range of 0.5 to 0.001 and n is at least 25, and A is a divalent arylene group having a fused or isolated aromatic ring and from 6 to 18 carbon atoms, and is solely comprised of carbon and hydrogen.

13. Process of claim 11 wherein the arylene group in said thioarylene segments is